(12) United States Patent
Schürg et al.

(10) Patent No.: US 11,492,986 B1
(45) Date of Patent: Nov. 8, 2022

(54) METHOD OF OPERATING A SUPERCHARGED INTERNAL COMBUSTION ENGINE

(71) Applicant: Dr. Ing. h.c. F. Porsche Aktiengesellschaft, Stuttgart (DE)

(72) Inventors: Frank Schürg, Gerlingen (DE); Peter Rothenberger, Philippsburg (DE); Andreas Weißhaar, Weinstadt (DE); Lukas Engin, Ingersheim (DE); Michael Wessels, Bietigheim-Bissingen (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 0 days.

(21) Appl. No.: 17/746,010

(22) Filed: May 17, 2022

(30) Foreign Application Priority Data

Sep. 29, 2021 (DE) ............ 10 2021 125 197.4

(51) Int. Cl.
*F02D 41/00* (2006.01)
*F02B 37/16* (2006.01)
*F01N 3/20* (2006.01)
*F02D 41/06* (2006.01)

(52) U.S. Cl.
CPC ....... *F02D 41/0007* (2013.01); *F01N 3/2006* (2013.01); *F02B 37/16* (2013.01); *F02D 41/064* (2013.01); *F02D 2200/021* (2013.01)

(58) Field of Classification Search
CPC .......... F02B 37/16; F02B 37/18; F02B 37/04; F01N 3/2006; F01N 3/30; F02D 41/064; F02D 41/068
See application file for complete search history.

(56) References Cited

U.S. PATENT DOCUMENTS

| 6,688,104 | B2 | 2/2004 | Baeuerle et al. |
| 8,806,868 | B2 * | 8/2014 | Wu ............ F01N 3/30 60/605.1 |
| 10,563,571 | B2 | 2/2020 | Kindi et al. |

(Continued)

FOREIGN PATENT DOCUMENTS

| DE | 10136977 A1 | 2/2003 |
| DE | 10235194 A1 | 8/2003 |
| DE | 102010027220 A1 | 1/2012 |

(Continued)

*Primary Examiner* — Ngoc T Nguyen
(74) *Attorney, Agent, or Firm* — RatnerPrestia

(57) ABSTRACT

A method for operating a supercharged internal combustion engine. Before a cold start of the engine, an electric drive device of an electrically assisted exhaust-gas turbocharger of the engine is activated such that fresh air is compressed by a compressor of the turbocharger and, in the process, is heated and is conveyed via an open overrun air recirculation valve arranged downstream of the compressor, through a short circuit back to a suction side of the compressor of the turbocharger. A proportion of the air that is heated by way of the short-circuit operation of the compressor is, downstream of the compressor and upstream of a closed throttle flap of the engine, conducted via a secondary air system into an exhaust manifold and from there via a wastegate of the turbocharger into the catalytic converters of an exhaust-gas aftertreatment device of the engine.

6 Claims, 2 Drawing Sheets

(56) References Cited

U.S. PATENT DOCUMENTS 10,975,789 B2    4/2021  Martz et al.
2020/0271046 A1*  8/2020  Kelly ..................... F02B 37/10

FOREIGN PATENT DOCUMENTS

| DE | 102013013663 A1 | 2/2015 | | |
|----|-----------------|--------|---|---|
| DE | 102017200800 A1 | 7/2018 | | |
| DE | 102017223639 B3 * | 4/2019 | ............. | F02B 37/04 |
| DE | 102019115180 A1 | 12/2019 | | |
| DE | 102018217569 A1 | 4/2020 | | |
| DE | 102019005155 A1 | 1/2021 | | |
| DE | 102020134030 A1 * | 1/2022 | | |

* cited by examiner

METHOD OF OPERATING A SUPERCHARGED INTERNAL COMBUSTION ENGINE

CROSS-REFERENCE TO RELATED APPLICATION

This application claims priority to German Patent Application No. 10 2021 125 197.4, filed Sep. 29, 2021, the content of such application being incorporated by reference herein in its entirety.

FIELD OF THE INVENTION

The present invention relates to a method for operating a supercharged internal combustion engine, in particular a gasoline engine.

BACKGROUND OF THE INVENTION

During a cold-start phase of a supercharged internal combustion engine, in particular of a gasoline engine, the fresh air that is fed to the combustion process impinges on cold walls in the inlet channel and in the combustion chamber of the internal combustion engine. Said fresh air thus remains considerably colder during the charge exchange, and even during the subsequent compression in the combustion chamber, than in the state in which the internal combustion engine is at operating temperature. The injected fuel thus evaporates more slowly in the cold fresh air both during the charge exchange and during the compression. This results in wall wetting and incomplete combustion of the fuel, which thus increase the pollutant emissions, for example of unburned hydrocarbons, carbon monoxide (CO) and soot particles. During the cold start phase in the presence of very cold ambient temperatures, the air temperature in the combustion chamber decreases further, such that the pollutant emissions increase further.

To alleviate this problem, the prior art has already disclosed various methods for warming intake air, for example by switchable induction of the fresh air in targeted fashion from the region of the exhaust manifold, which warms up quickly, during the cold-start phase, or by means of additional electrical heating elements in the intake tract. These additional switching and heating elements of the solutions known from the prior art for warming intake air however lead to an increase in weight of the vehicle, an increased structural space requirement, and higher costs.

DE 10 2017 200 800 A1, which is incorporated by reference herein, discloses a supercharged internal combustion engine and a method for operating such an internal combustion engine, wherein intake air compressed by means of an electrical compressor of an electrically assisted exhaust-gas turbocharger is, for the purposes of warming, conducted in a short circuit back to a suction side of the compressor.

DE 10 2019 115 180 A1, which is incorporated by reference herein, discloses a supercharged internal combustion engine and a method for operating such an internal combustion engine, wherein the intake air compressed by means of an electrical compressor is, for the purposes of warming, conducted through a short circuit back to the suction side of the compressor, and wherein a charge-air cooler of the internal combustion engine is bypassed during warm-up operation.

SUMMARY OF THE INVENTION

In a method according to aspects of the invention for operating a supercharged internal combustion engine, in particular a gasoline engine, it is provided:
that, before a cold start of the internal combustion engine, an electric drive device of an electrically assisted exhaust-gas turbocharger of the internal combustion engine is activated such that fresh air is compressed by a compressor of the electrically assisted exhaust-gas turbocharger and, in the process, is heated, wherein the compressed air is conveyed via an open valve arranged downstream of the compressor, in particular an overrun air recirculation valve, through a short circuit back to a suction side of the compressor of the electrically assisted exhaust-gas turbocharger, and
that a proportion of the air that is heated by way of the short-circuit operation of the compressor is, downstream of the compressor and upstream of a closed throttle flap of the internal combustion engine, conducted via a secondary air system into an exhaust manifold and from there via a wastegate of the electrically assisted exhaust-gas turbocharger into the catalytic converters of an exhaust-gas aftertreatment device of the internal combustion engine. By means of this measure, the heating-up of the catalytic converters of the exhaust-gas aftertreatment device of the internal combustion engine can be assisted in an effective manner already before the starting of the internal combustion engine, such that the catalytic converters can reach their operating temperature more quickly. In this way, the pollutant emissions of the supercharged internal combustion engine can easily be reduced in an effective manner.

In one preferred embodiment, it is proposed that, after the starting of the internal combustion engine, during a cold-start phase and a subsequent warm-up of the internal combustion engine, the electric drive device of the electrically assisted exhaust-gas turbocharger continues to be activated and the compressor is driven and, in conjunction with a partially closed throttle flap and the open valve, in particular the open overrun air recirculation valve, the fresh air is compressed and warmed by the compressor of the electrically assisted exhaust-gas turbocharger and is then predominantly conveyed in the short circuit back to the suction side of the compressor, wherein the air quantity required for the respective operating point of the internal combustion engine flows, having been preheated, into the combustion chamber of the internal combustion engine via the partially closed throttle flap. As a result of the flow of the preheated air quantity that is required for the respective operating point of the internal combustion engine into the combustion chamber, the process of combustion of the fuel-air mixture can be advantageously improved. This likewise has a positive effect on the pollutant emissions.

In a further advantageous embodiment, it is proposed that the warmed air is, within the exhaust-gas aftertreatment device, additionally conducted via an electrically heated catalytic converter and is subsequently supplied to further catalytic converters of the exhaust-gas aftertreatment device. The additional warming of the air by means of the electrically heated catalytic converter advantageously allows faster warming of the downstream catalytic converters of the exhaust-gas aftertreatment device of the internal combustion engine.

In a particularly advantageous embodiment, it is possible that, through defined control of the rotational speed of the electrically assisted exhaust-gas turbocharger, of the throttle flap and preferably also of the overrun air recirculation valve, the compressor of the electrically assisted exhaust-gas turbocharger is brought into an operating range with intense flow recirculation. It is thus advantageously achieved that the aerodynamic losses and thus also the introduction of heat into the fresh air are considerably increased, resulting in further improved warming of the fresh air.

In one advantageous embodiment, it is proposed that the warmed air is conducted via a bypass line past a charge-air cooler of the internal combustion engine. An undesired loss of heat from the air can thus be advantageously reduced.

In an alternative embodiment, it is possible that a loss of heat from the compressed air via the charge-air cooler is reduced by closing active closing elements in a cooling-air path of the charge-air cooler.

By means of the operating strategy disclosed here, the existing electrically assisted exhaust-gas turbocharger is utilized as a heating element for the intake air. Without the need for additional heating elements, the intake air is heated already before the cold start of the internal combustion engine, and then during the cold-start phase, by means of electrical energy from a battery that is used to drive the electrically assisted compressor, to such an extent that a significantly higher air temperature level is reached in the combustion chamber during the intake stroke and the compression stroke of the internal combustion engine. The fuel evaporation, the mixture formation and the combustion thus take place more ideally and more completely, such that the pollutant emissions of the internal combustion engine decrease.

BRIEF DESCRIPTION OF THE DRAWING FIGURE

Further features and advantages of the present invention will become clear on the basis of the following description of a preferred exemplary embodiment with reference to the appended figure.

DETAILED DESCRIPTION OF THE INVENTION

Figure 1:
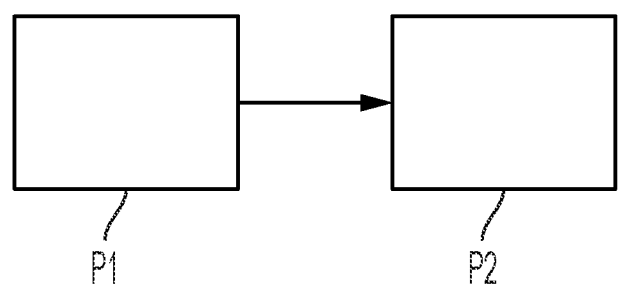
FIG. 1 shows the basic sequence of a method for operating a supercharged internal combustion engine, in particular a gasoline engine, in schematically highly simplified form.

Firstly, in a first operating phase P1 already before the cold start of the internal combustion engine, in particular of the gasoline engine, an activation of a battery-fed electric drive device of an electrically assisted exhaust-gas turbocharger causes fresh air to be compressed by means of a compressor of the electrically assisted exhaust-gas turbocharger. Via an open overrun air recirculation valve arranged downstream of the compressor, the compressed air is conveyed through a short circuit back to a suction side of the compressor of the electrically assisted exhaust-gas turbocharger. Here, the compression of the air and the aerodynamic losses heat the fresh air and those components of the internal combustion engine through which said fresh air flows.

After the starting of the internal combustion engine, during the cold-start phase and the subsequent warm-up of the internal combustion engine in a second operating phase P2, by means of continued activation of the electric drive device of the electrically assisted exhaust-gas turbocharger in conjunction with a partially closed throttle flap and the open overrun air recirculation valve, the fresh air is compressed by means of the compressor of the electrically assisted exhaust-gas turbocharger and is then predominantly conveyed in the short circuit back to the upstream suction side of the compressor. Here, the compression of the air and the aerodynamic losses further heat the fresh air and the components through which said fresh air flows. Only a small proportion of the air quantity that is pumped within the short circuit—specifically exactly the air quantity required for the respective operating point of the internal combustion engine—then flows, having been heated, via the partially closed throttle flap into the combustion chamber of the internal combustion engine.

In conjunction with a secondary air system, during the first operating phase P1 already before the starting of the internal combustion engine, a proportion of the air heated by way of the short-circuit operation of the compressor is, downstream of the compressor and upstream of the still-closed throttle flap, conducted via the secondary air system into an exhaust manifold of the internal combustion engine and from there via a wastegate of the exhaust-gas turbocharger into the catalytic converters of an exhaust-gas aftertreatment device of the internal combustion engine. The catalytic converters of the exhaust-gas aftertreatment device are thus advantageously preheated already before the starting of the internal combustion engine, such that they can reach their operating temperature more quickly. This has a positive effect on the pollutant emissions during the subsequent operation of the internal combustion engine.

Even after the starting of the internal combustion engine, during the second operating phase P2 and during the ongoing heating-up operation of the catalytic converters using the secondary air, the pre-warming of the secondary air can be utilized in order to stabilize the secondary air reaction in the exhaust manifold of the internal combustion engine and thus reduce untreated emissions and increase the secondary air heating power.

In one advantageous embodiment, the air that is warmed in this way can additionally be conducted via an electrically heated catalytic converter and subsequently be supplied to the other catalytic converters of the exhaust-gas aftertreatment device. By means of this measure, the heating of those catalytic converters of the exhaust-gas aftertreatment device which are arranged downstream of the electrically heated catalytic converter can be further accelerated.

It is furthermore possible that, through targeted control of the rotational speed of the electrically assisted exhaust-gas turbocharger, of the throttle flap and optionally also of the overrun air recirculation valve, the compressor of the electrically assisted exhaust-gas turbocharger is brought into an operating range with intense flow recirculation (so-called "surging"). This advantageously considerably increases the aerodynamic losses and thus the introduction of heat into the fresh air.

An undesired loss of heat from the compressed air via a charge-air cooler of the internal combustion engine can optionally be prevented by virtue of the warmed air being conducted past the charge-air cooler via a bypass line.

It is furthermore optionally possible for the loss of heat from the compressed air via the charge-air cooler to be reduced by closing active closing elements in a cooling air path of the charge-air cooler, in particular through the use of so-called charge-air cooler shutters.

In particular in combination with a starting operation by means of an integrated starter-generator (ISG), the internal combustion engine can be cranked to its starting rotational speed and advantageously supplied with correspondingly preheated process air already upon the enablement of injection (that is to say after the evacuation of the cold process air volume downstream of the throttle flap in the intake pipe).

Figure 2:
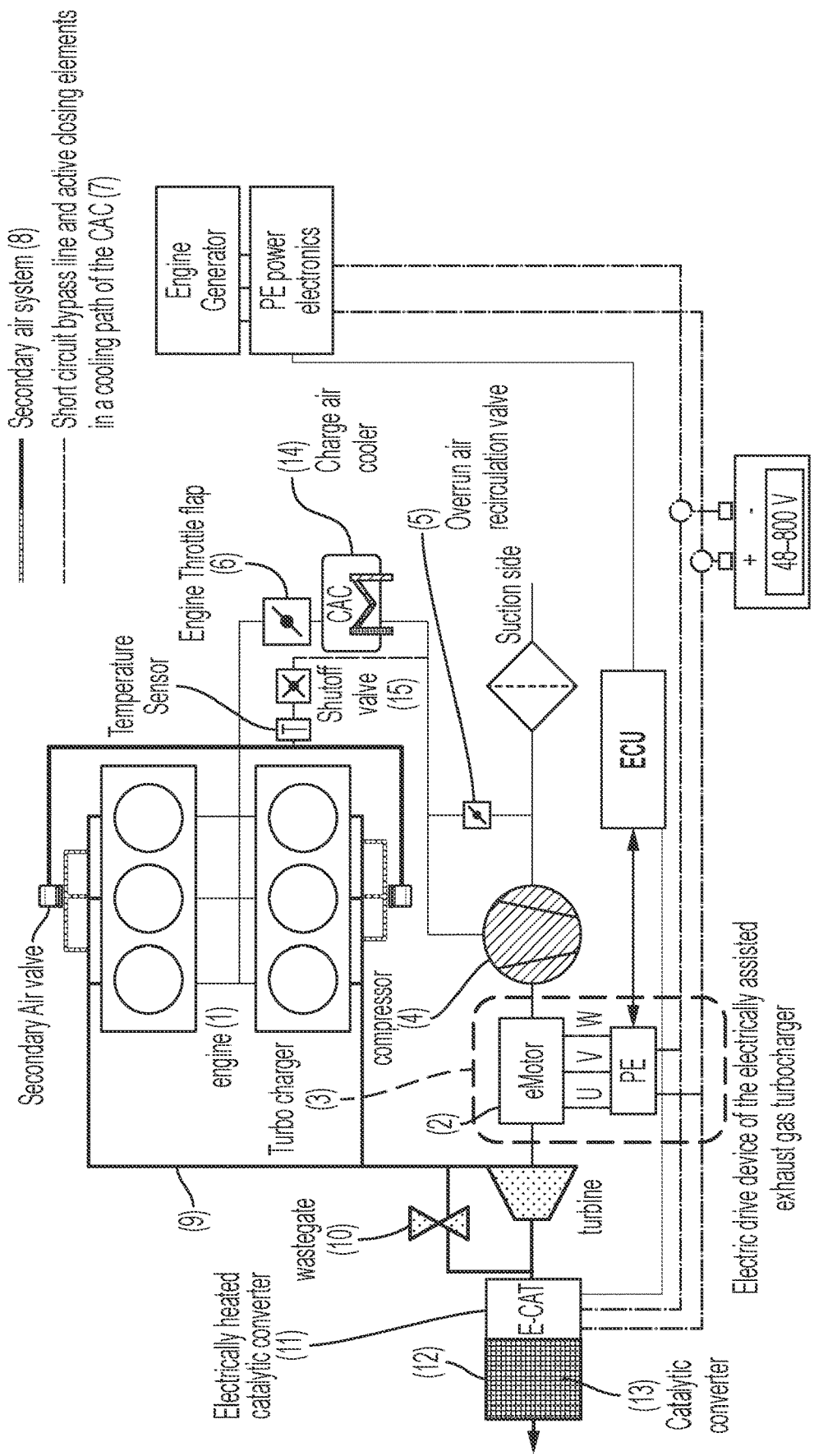
FIG. 2 shows a schematic of the supercharged internal combustion engine.

Turning now to FIG. 2, a method for operating a supercharged internal combustion engine 1 is provided. According to the method, before a cold start of the internal combustion engine 1, the method includes activating an electric drive device 2 of an electrically assisted exhaust-gas turbocharger 3 of the internal combustion engine 1 such that fresh air is compressed by a compressor 4 of the electrically assisted exhaust-gas turbocharger 3 and, in the process, is heated and is conveyed via an open air recirculation valve 5 arranged downstream of the compressor 4, through a short circuit 7 back to a suction side of the compressor 4 of the electrically assisted exhaust-gas turbocharger 2.

At a location downstream of the compressor 4 and upstream of a closed throttle flap 6 of the internal combustion engine 1, the method further includes conducting a proportion of the air that is heated by way of a short-circuit operation of the compressor 4 via a secondary air system 8 into an exhaust manifold 9 and from there via a wastegate 10 of the electrically assisted exhaust-gas turbocharger 3 into the catalytic converters 11 of an exhaust-gas aftertreatment device 12 of the internal combustion engine 1.

After starting of the internal combustion engine 1, during a cold-start phase and a subsequent warm-up of the internal combustion engine, the electric drive device 2 of the electrically assisted exhaust-gas turbocharger 3 continues to be activated and the compressor 4 is driven and, in conjunction with a partially closed throttle flap 6 and the open overrun air recirculation valve 5, the fresh air is compressed and warmed by the compressor 4 of the electrically assisted exhaust-gas turbocharger 3 and is then predominantly conveyed in the short circuit 7 back to the suction side of the compressor 4, wherein the air quantity required for the respective operating point of the internal combustion engine 1 flows, having been preheated, into the combustion chamber of the internal combustion engine via the partially closed throttle flap 6.

The method also includes conducting the warmed air within the exhaust-gas aftertreatment device 12 via an electrically heated catalytic converter 11 and subsequently supplying the warmed air to further catalytic converters 13 of the exhaust-gas aftertreatment device 12.

Through defined control of a rotational speed of the electrically assisted exhaust-gas turbocharger 3, of the throttle flap 6 and also of the overrun air recirculation valve 5, the compressor 4 of the electrically assisted exhaust-gas turbocharger 3 is brought into an operating range with intense flow recirculation.

The method also includes conducting the warmed air via a bypass line 7 past a charge-air cooler 14 of the internal combustion engine 1. A loss of heat from the compressed air via the charge-air cooler 14 can be reduced by closing active closing elements 15 in a cooling-air path of the charge-air cooler 14.

What is claimed:

1. A method for operating a supercharged internal combustion engine, said method comprising the steps of:
    before a cold start of the internal combustion engine, activating an electric drive device of an electrically assisted exhaust-gas turbocharger of the internal combustion engine such that fresh air is compressed by a compressor of the electrically assisted exhaust-gas turbocharger and, in the process, is heated and is conveyed via an open air recirculation valve arranged downstream of the compressor, through a short circuit back to a suction side of the compressor of the electrically assisted exhaust-gas turbocharger, and
    at a location downstream of the compressor and upstream of a closed throttle flap of the internal combustion engine, conducting a proportion of the air that is heated by way of a short-circuit operation of the compressor via a secondary air system into an exhaust manifold and from there via a wastegate of the electrically assisted exhaust-gas turbocharger into the catalytic converters of an exhaust-gas aftertreatment device of the internal combustion engine.

2. The method as claimed in claim 1, wherein after starting of the internal combustion engine, during a cold-start phase and a subsequent warm-up of the internal combustion engine, the electric drive device of the electrically assisted exhaust-gas turbocharger continues to be activated and the compressor is driven and, in conjunction with a partially closed throttle flap and the open overrun air recirculation valve, the fresh air is compressed and warmed by the compressor of the electrically assisted exhaust-gas turbocharger and is then predominantly conveyed in the short circuit back to the suction side of the compressor, wherein the air quantity required for the respective operating point of the internal combustion engine flows, having been preheated, into the combustion chamber of the internal combustion engine via the partially closed throttle flap.

3. The method as claimed in claim 1, wherein further comprising conducting the warmed air within the exhaust-gas aftertreatment device via an electrically heated catalytic converter and subsequently supplying the warmed air to further catalytic converters of the exhaust-gas aftertreatment device.

4. The method as claimed in claim 1, wherein through defined control of a rotational speed of the electrically assisted exhaust-gas turbocharger, of the throttle flap and also of the overrun air recirculation valve, the compressor of the electrically assisted exhaust-gas turbocharger is brought into an operating range with intense flow recirculation.

5. The method as claimed in claim 1, further comprising conducting the warmed air via a bypass line past a charge-air cooler of the internal combustion engine.

6. The method as claimed in claim 1, further comprising reducing a loss of heat from the compressed air via the charge-air cooler by closing active closing elements in a cooling-air path of the charge-air cooler.

* * * * *